(12) United States Patent
Kenny

(10) Patent No.: US 7,168,760 B2
(45) Date of Patent: Jan. 30, 2007

(54) SEAT COVER

(75) Inventor: Kevin Brian Kenny, Camarillo, CA (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 11/044,795

(22) Filed: Jan. 27, 2005

(65) Prior Publication Data

US 2005/0206207 A1   Sep. 22, 2005

Related U.S. Application Data

(60) Provisional application No. 60/539,682, filed on Jan. 28, 2004.

(51) Int. Cl.
A47C 31/11   (2006.01)

(52) U.S. Cl. ............... 297/229; 297/219.1; 297/228.1; 297/228.11

(58) Field of Classification Search ............... 297/229, 297/228.1, 228.11, 228.12, 228.13, 219.1
See application file for complete search history.

(56) References Cited

U.S. PATENT DOCUMENTS

| | | | | |
|---|---|---|---|---|
| 2,817,391 A * | 12/1957 | Zacks | ..................... | 297/229 |
| 3,278,226 A * | 10/1966 | Magnusson | ............... | 297/228.1 |
| 4,320,922 A | 3/1982 | Meritis | ..................... | 297/220 |
| 4,396,227 A | 8/1983 | Neilson | ..................... | 297/219 |
| 4,694,511 A * | 9/1987 | Estes et al. | ............ | 297/229 X |
| 4,799,731 A | 1/1989 | Brown | ..................... | 297/192 |
| 5,005,901 A * | 4/1991 | Hinde | ..................... | 297/229 |
| 5,112,104 A * | 5/1992 | De Giacomi | ............... | 297/229 |
| 5,275,463 A * | 1/1994 | Rocha | ..................... | 297/229 |
| 5,533,787 A | 7/1996 | Xiang | ..................... | 297/284.5 |
| 5,707,107 A * | 1/1998 | Melone | ................... | 297/228.1 |
| 5,843,556 A | 12/1998 | Levas | ..................... | 428/99 |
| 5,957,528 A | 9/1999 | Campbell | ............. | 297/228.12 |
| 5,975,638 A * | 11/1999 | Schreiner | ........... | 297/228.13 X |
| 6,309,017 B1 | 10/2001 | Middleton | ............... | 297/219.1 |
| 6,312,051 B1 * | 11/2001 | Adams | .................. | 297/228.11 |
| 6,345,866 B1 | 2/2002 | Jackson et al. | ........ | 297/228.12 |
| 6,626,491 B1 * | 9/2003 | Blome et al. | .............. | 297/229 |
| 6,655,735 B1 | 12/2003 | Learning | ................. | 297/228.1 |
| 6,655,736 B1 * | 12/2003 | Arenas | ..................... | 297/229 |
| 6,659,551 B1 * | 12/2003 | Arenas | ..................... | 297/229 |
| 2004/0036328 A1 * | 2/2004 | Johnson | ................... | 297/219.1 |

FOREIGN PATENT DOCUMENTS

WO   WO 9412366 A1 *   6/1994   ............ 297/228.12

* cited by examiner

*Primary Examiner*—Rodney B. White

(57) ABSTRACT

A seat cover is useful for covering seats, where the seats include automobile seats. The seat cover can include at least one pouch and or pocket. Further, the seat cover is similar in appearance to a pullover exercise top, where the at least one pouch or pocket resembles a hand warmer and the other pouch resembled a hood.

22 Claims, 3 Drawing Sheets

SEAT COVER

This application claims the benefit of U.S. Provisional Application No. 60/539,682 filed Jan. 28, 2004, the entire disclosure of which is hereby incorporated by reference.

BACKGROUND OF THE INVENTION

1. Field of the Invention

The invention relates generally to the field of seat covers. More specifically the present invention deals with seat covers for use with automobiles. Yet more specifically, the present invention concerns automobile seat covers equipped with pockets and/or pouches. Yet even more specifically, the present invention deals with novel automobile seat covers having pockets and pouches, where the seat cover resembles a hooded jacket with sleeves and the hood can be used as a pocket.

2. Description of Related Art

A myriad of covers for seats have been proposed throughout the years. The primary function of seat covers is to provide a protective layer between the seat and the user in order to reduce the wear experienced by the seat thereby prolonging the useful life of the seat. Seat covers can also serve to protect the seat from undesirable contact with substances, such as liquids, that can stain or otherwise damage the seat. Advances have been made in the way seat covers are attached to seats in order to enhance how well the covers stay secured to the seats as well as the ease of application and removal of the seat covers. Many of these advancements have come in relation to automotive seats covers. These advances in attachment means include the use of hook and loop fasteners such as VELCRO®, straps with buckles, straps with hooks or rings for attachment, to name a few.

Additional advancements include materials that improve the protective or liquid barrier capabilities of the seat cover as well as the overall appearance of the covers. Synthetic materials have been proposed in addition to natural materials, such as sheepskin and wool. Some of the advancements have come in the form of additional features with the covers and additional functions of the covers. For example, seat covers have been proposed that are readily retractable for easy storage. Others have introduced seat covers having attachable drink holders and storage bins. Additional functions suggested for seat covers include structural back support for the user, such as lumbar support. Some seat covers have been proposed having multiple uses, such as a beach towel, tote bag, as well as a chair cover. Examples of these inventions can be found in the following references: Levas, U.S. Pat. No. 5,843,556, Xiang, U.S. Pat. No. 5,533,787, Meritis, U.S. Pat. No. 4,320,922, Brown, U.S. Pat. No. 4,799,731, Middleton, U.S. Pat. No. 6,309,017, Learning, U.S. Pat. No. 6,655,735, Campbell, U.S. Pat. No. 5,957,528, Neilson, U.S. Pat. No. 4,396,227, and Jackson, U.S. Pat. No. 6,345,866.

However, none of the aforementioned inventions include a seat cover having features capable of altering the overall appearance of the seat. Further, these references fail to suggest a seat cover that is capable of giving the impression of a sentry type subject within the seat. Thus a need exists for a seat cover whose features give the seat a unique appearance as well as providing the look of a sentry within the seat.

BRIEF SUMMARY OF THE INVENTION

The present invention involves a seat cover for use with a seat having a seat back and seat bottom comprising a front panel, an attachment between the front panel and the seat back, and a hood portion securable to the front panel, wherein the hood portion can be positioned to the uppermost portion of the front panel thereby giving the seat cover the appearance of a hooded shirt. The invention can also comprise a rear panel connectable to the front panel, where the hood portion can be connected to the rear panel as well. The seat cover of the present invention can further comprise a base portion capable of covering a seat bottom. An attachment strap can be included with the present invention that is capable of connecting the front panel and the rear panel. The attachment strap can comprise at least one strap member securable to both the front panel and the rear panel. Alternatively, the attachment strap can comprise an elongated member. The elongated member can extend substantially along the length of the front panel and the rear panel, thereby giving the seat cover the appearance of a sleeved shirt. The seat cover can be used in conjunction with automotive seats, straight back chairs, easy chairs, and any other type of seat having a back and bottom.

The hood portion can be drawn back from the uppermost portion along the rear panel, thereby providing the capability of stowing objects within the hooded portion. The seat cover can further comprise a pocket attachable to the rear panel that is accessible on either of its sides. The pocket can have the appearance of a hand-warming pouch. Additionally the seat cover can include a logo. The combination of the hood portion and the sleeved shirt appearance can make it appear as though the seat contains a passenger when in fact it is empty.

An alternative embodiment of the present invention includes a seat cover for use with a seat having a seat back and seat bottom comprising, a front panel, a rear panel disposed substantially parallel to the front panel, and side panels substantially perpendicular to the front panel and the rear panel. Wherein the side panels extend along the length of the front panel and the rear panel and provide a connection member connecting the front panel to the rear panel. The combination of the front, rear, and side panels forms an enclosure suitable for receiving the seat back. Also included is a hood portion having a rim and a hollowed out section, where the hood portion is connectable to the uppermost portion of the front panel and rear panel along at least a portion of the rim. The seat cover of the alternative embodiment can further comprise a base portion capable of covering a seat bottom. Optionally, the panels can comprise elongated members that extend substantially along the length of the front panel and the rear panel, thereby giving the seat cover the appearance of a sleeved shirt.

Further, the hood portion of the seat cover can be positioned to the top of the seat cover, thereby giving the seat cover the appearance of a hooded shirt. Alternatively, the hood portion can be positioned along the rear panel, thereby providing a pouch within the hood portion capable of stowing objects within. A pocket can be included with the alternative invention attachable to the rear panel. The pocket can be accessible on either of its sides, the pocket thereby having the appearance of a hand-warming pouch. A logo can be included with the invention. The present invention therefore provides as one of its many advantages of giving a seat a unique appearance of a hooded sweatshirt that includes pockets and pouches. The present invention can also give a seat the impression that a sentry is disposed within the seat thereby deterring theft or possible assaults, especially when used in combination with an automobile seat.

DETAILED DESCRIPTION OF THE INVENTION

Figure 1:
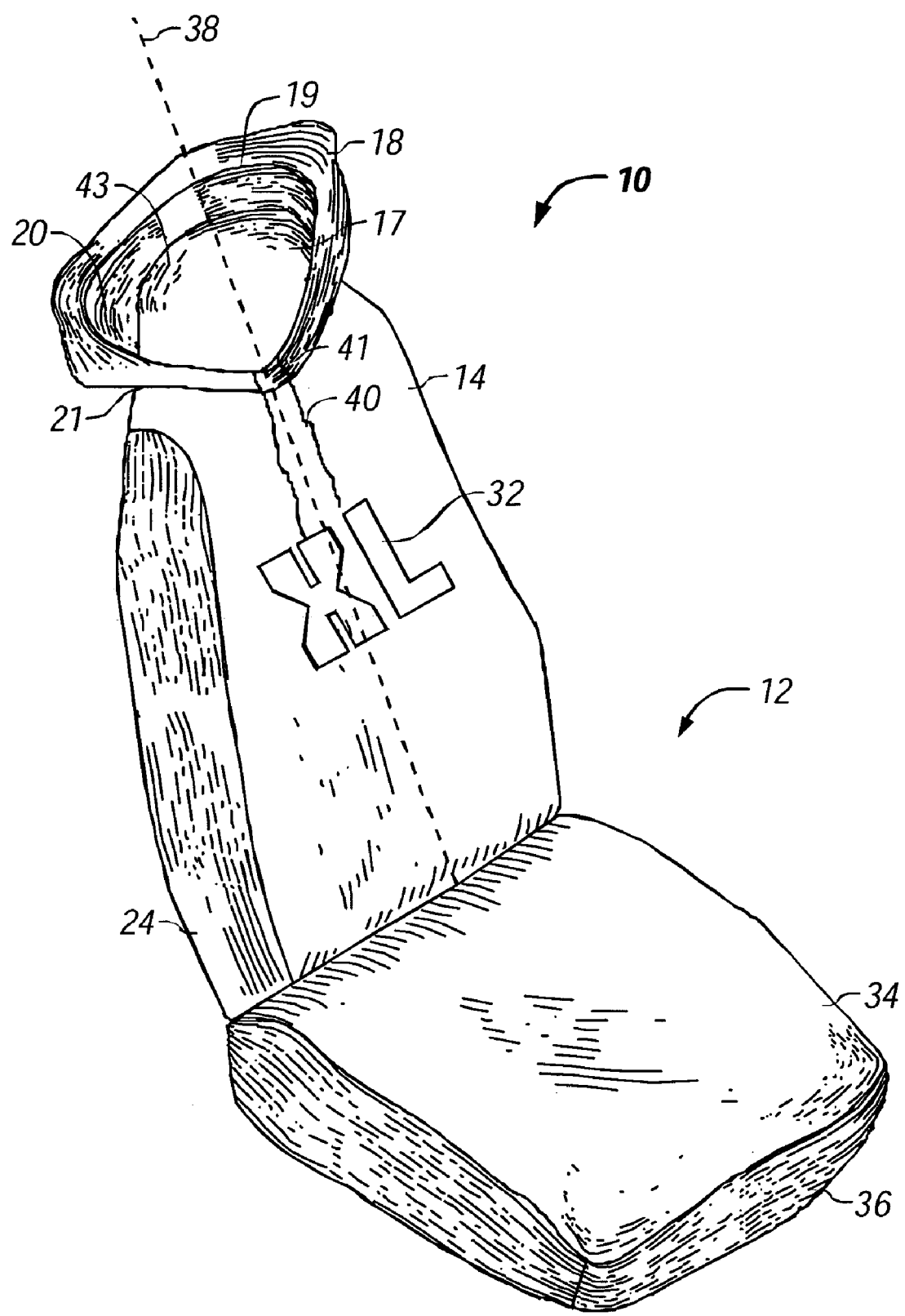
FIG. 1 depicts a frontal perspective view of an embodiment of the present invention.

With reference to the drawings herein, FIG. 1 depicts one embodiment of a seat cover 12 covering a seat 10. While the seat 10 of FIG. 1 is an automobile seat, the seat cover 12 of the present invention is not limited to automotive seat covers, but can be used in combination with any type of seat having a back and bottom, such as straight back chairs, recliners, easy chairs, to name a few. For the purposes of disclosure herein, the front of the seat 10 describes the side of the seat where the individual using the seat would normally be situated. Similarly the base or bottom of the seat 10 generally describes the area on which the individual would typically be sitting and the rear of the seat 10 describes the area on the upright section of the seat on the opposite side of the front. The seat back generally refers to the upright portion of the seat 10 against which the person sitting in the chair would position his or her back and head.

The seat cover 12 includes a front panel 14 attachable to a rear panel 16. The front panel 14 is substantially planar and formed to be positioned on the upright portion of a seat along the front portion of the seat 10. The rear panel 16 is also substantially planar and is formed for positioning on the rear of the upright portion of the seat. The rear panel 16 is attachable to the front panel 14, preferably along the outer periphery of the front panel 14 and the rear panel 16.

Optionally, a logo 32 can be included on the front panel 14, where the logo 32 can display a fanciful logo, sports team logo, a brand logo, or any other type of graphic design desired by the user. The material of the seat cover 12 can include any currently used materials, such as cotton, wool, leather, synthetic materials, and the like, or any later developed suitable materials. Additionally, the material of the seat cover 12 can be similar to or the same as the material used in the manufacture of typical sweat shirts.

Also included with the embodiment shown in FIG. 1 is a hood portion 18 having an opening 19 on one of its ends that opens up into a hollowed out portion 20. A rim 21 is disposed on the side of the hood portion 18 opposite the opening 19. The hood portion 18 is attachable along the rim 21 to the upper portion 15 of the seat cover 12 on both the front panel 14 and the rear panel 16. Preferably the hood portion 18 is attached to the front panel 14 in a "V" like pattern such that the apex of the V is at the lower most portion of the rim 21, i.e. the V being pointed downwards. The apex of the V should be at or close to the vertical line 38 that vertically bisects the front panel 14. The opening 19 of the hood portion 18 can be positioned forward (in a direction opposite to the position of the rear panel 16) to partially encompass the uppermost section 17 of the seat cover 12. One of the many advantages of the present invention is that combining the V pattern of the rim 21 as above described along with the forward positioning of the hood portion 18 gives the seat cover 12 the overall appearance of a hooded sweatshirt. A seat 10 having the appearance of a hooded sweatshirt can provide an impression of a person sitting in the seat 10 when in fact the seat 10 is empty. In addition to the unique look this provides, the appearance of one or more persons in a seat can make an area more secure by giving the appearance of a sentry within the seat 10. In one non-limiting example, the seat cover 12 of the present invention could deter potential car thieves if it appeared one or more persons were in an otherwise empty automobile as well as possibly preventing assaults of a single person within the automobile by giving the appearance of one or more passengers.

Figure 2:
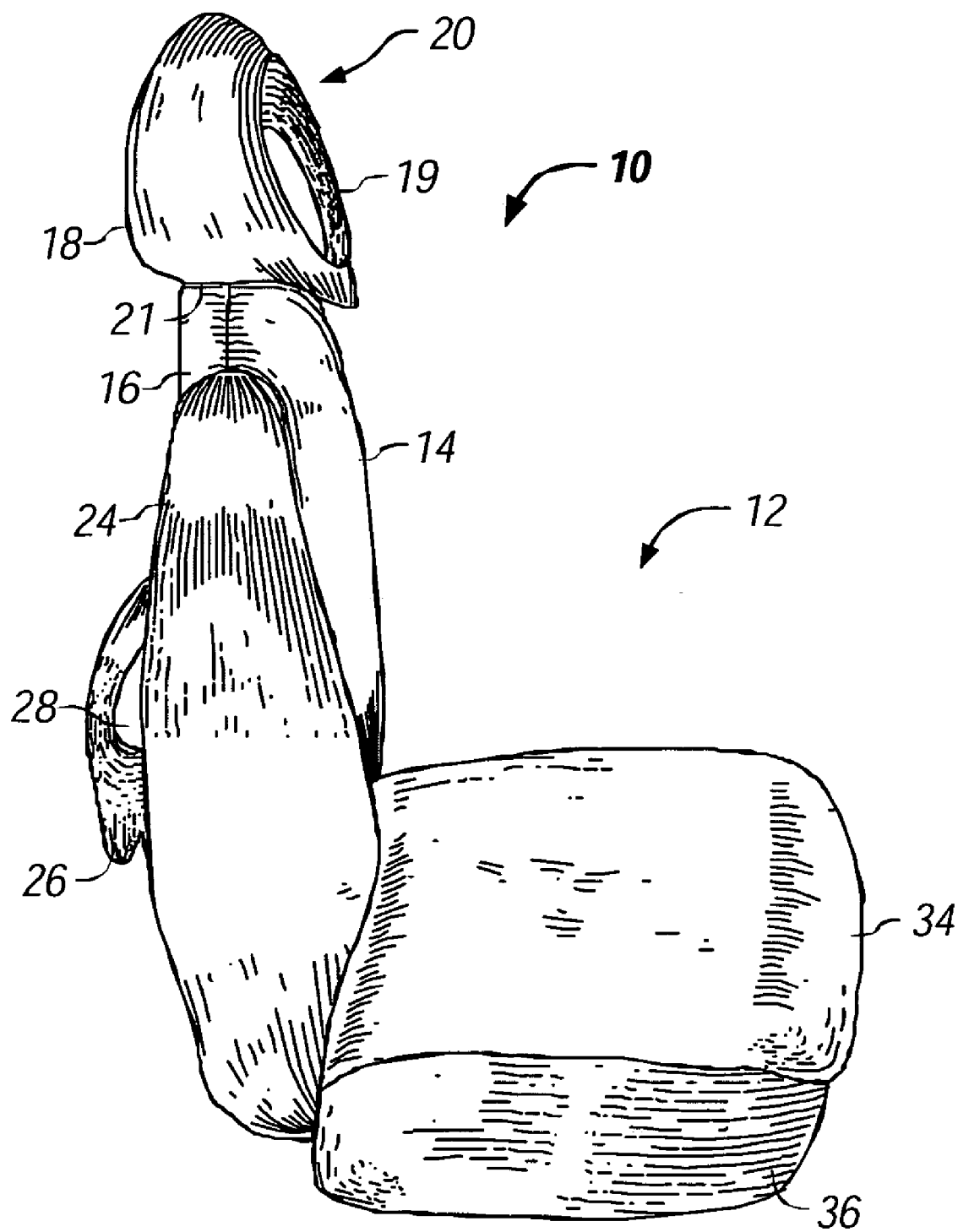
FIG. 2 illustrates a side view of an embodiment of the present invention.
Figure 3:
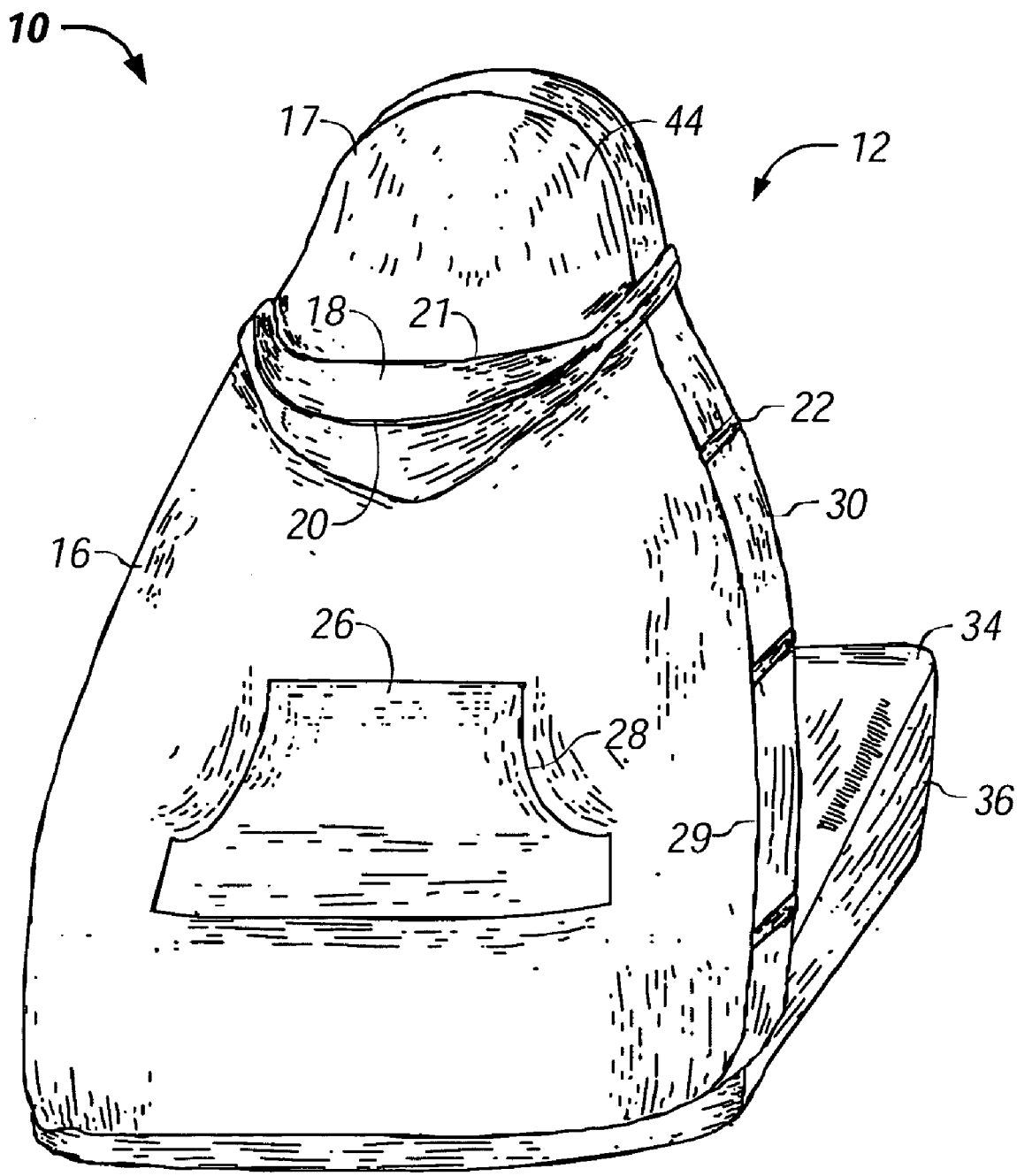
FIG. 3 portrays a rear perspective view of an embodiment of the present invention.

As shown in FIGS. 1, 2, and 3, the seat cover 12 of the present invention can further include a base portion 34 combinable with the bottom of a seat 10. The base portion 34 is substantially planar and extends in a generally perpendicular direction from the lowermost portion of the front panel 14 along the periphery of the base of the seat 10. The base portion 34 can be attachable to the remaining components of the seat cover 12, or simply to the seat bottom itself. Securable along the outer perimeter of the base portion 34 is a base portion side panel 36 that extends downward from the base portion 34 to cover the side sections of the seat base. The manner of securing the base portion 34 to the seat base or the remaining portions of the seat cover 12 can include straps (not shown), hook and loop fasteners, snaps, straps and buckles, rings and hooks, or any other suitable securing methods or devices.

As previously noted, the front panel 14 is securable to the rear panel 16 along their outer periphery. With reference to the embodiment of the invention shown in FIGS. 1 and 2, the front panel 14 and rear panel 16 are directly affixed along their respective upper most portions (43 and 44) and along a portion of their sides (29 and 30). In the embodiments of FIGS. 1 and 2 at least one side panel 24 is included that connects the front panel 14 to the rear panel 14 along the remaining portion of one of their sides (29 and 30). An additional side panel 24 can be included thereby connecting the front panel 14 to the rear panel 16 on their respective opposite sides (29 and 30). The side panel 24 of this embodiment of the invention is mostly planar and has an elongated shape, where the length of the side panel 24 extends substantially along the respective lengths of the front panel 14 and the rear panel 16.

The width of the side panel 24 should be approximately the same as the width of the seat back that the seat cover 12 is being used with. Preferably the color of the side panel 24 should be different from the color of the front panel 14 and the rear panel 16 so that the side panel 24 is readily noticeable and distinguishable from both the front and rear panels (14 and 16). Being distinguishable from the front panel 14 and rear panel 16 can give the side panel 24 the appearance of a sleeve-like member thereby further enhancing the look of the seat cover 12 to simulate that of a sweatshirt.

It is preferred that the bottom most ends of the front and rear panels (14 and 16) be releasably connectable to one another as opposed to permanently affixed together. However, the bottom most ends of these panels (14 and 16) can be releasably connectable with devices such as straps (not shown), hook and loop fasteners, snaps, straps and buckles, rings and hooks, and the like. Optionally, as seen in FIG. 3, the entire outer perimeter of the front panel 14 and rear panel 16 can be connectable with one or more straps 22 disposed along their respective peripheries. These straps 22 can be sewn in, or can include hooks and loops, snaps, buckles, rings, or hooks.

With reference now to FIG. 3, an alternative embodiment of the invention is shown where the hood portion 18 is drawn down from the uppermost section 17 of the seat cover 14 and situated along the outer surface of the rear panel 16. Being disposed in this manner creates a pouch like member within the hollowed out portion 20 of the hood portion 18 that is capable of receiving items for stowage within. Also provided on the rear panel 16 in this embodiment of the invention is a pocket 26 also capable of storing items within. Along its outer perimeter, the pocket 26 can be secured to the rear panel 16. The pocket 26 can be secured to the rear panel 16 by sewing, snaps, rivets, or other suitable attachment devices. However, the pocket 26 is not secured to the rear panel 16 along its entire perimeter, but instead openings 28 are provided on both ends of the pocket 26 allowing access to the inside of the pocket 26 that allows for the storing and retrieval of objects within. One of the many advantages of the present invention involves the unique appearance of the pocket 26 combined with the capability of storing objects for a short or long duration with the ability of easy retrieval. The appearance of the pocket 26 combined with the hood portion 18, the side panel 24, and the sweatshirt like material of the seat cover 12 further provides a sweatshirt like appearance of the seat cover 12. Furthermore, the advantages introduced by the pocket 26 of the present invention are readily apparent especially when the seat cover 12 is combined with an automobile seat during long journeys. That is, items can be stored in the pocket 26 prior to or during a journey and kept there for easy retrieval at a later desired time.

The present invention described herein, therefore, is well adapted to carry out the objectives and attain the ends and advantages mentioned, as well as others inherent therein. While a presently preferred embodiment of the invention has been given for purposes of disclosure, numerous changes exist in the details of procedures for accomplishing the desired results. For example, a drawstring 40 can be included with the hood portion 18 via eyelets 41 formed onto the hood portion 18. The drawstring 40 can further add to the look and appearance of a hooded sweatshirt as well as provide the capability of adjusting the size of the opening 19 of the hood portion 18. These and other similar modifications will readily suggest themselves to those skilled in the art, and are intended to be encompassed within the spirit of the present invention disclosed herein and the scope of the appended claims.

What is claimed is:

1. A seat cover comprising:
a front panel having an uppermost portion;
a rear panel having an uppermost portion; wherein said front panel is connected to said rear panel; and
a hooded portion connected to a rim formed by the uppermost portions of said front and said rear panels, thereby giving said seat cover the appearance of a hooded shirt;
wherein said hooded portion comprises a hollowed out section for stowing objects within.

2. The seat cover of claim 1, further comprising a base portion capable of covering said seat bottom.

3. The seat cover of claim 1, further comprising a rear panel at least partially covering the rear side of said seat back, said hood portion connected to said rear panel and said rear panel connected to said front panel along a portion of their respective outer perimeters.

4. The seat cover of claim 3, further comprising an attachment strap capable of connecting said front panel and said rear panel.

5. The seat cover of claim 4, wherein said attachment strap comprises an elongated member.

6. The seat cover of claim 5, wherein said elongated member extends substantially along the length of the said front panel and said rear panel, thereby giving said seat cover the appearance of a sleeved shirt.

7. The seat cover of claim 6, wherein said hood portion can be positioned to the top of the seat cover, such that said seat cover has the appearance of a hooded shirt thereby providing the impression of a sentry within said seat due to the appearance of a hooded shirt combined with the appearance of a sleeved shirt.

8. The seat cover of claim 1, further comprising a pocket attachable to said rear panel, said pocket having the appearance of a hand-warming pouch.

9. The seat cover of claim 1, wherein said seat is selected from the group consisting of automotive seats, straight back chairs, recliners, and easy chairs.

10. The seat cover of claim 1, further comprising a logo.

11. The seat cover of claim 1, wherein said rim is V-shaped.

12. A seat cover comprising:
a front panel having an uppermost portion;
a rear panel having an uppermost portion;
side panels substantially perpendicular to said front panel and said rear panel, wherein said side panels extend along the length of said front panel and said rear panel and provide a connection member connecting said front panel to said rear panel; and
a hooded portion connected to a rim formed by the uppermost portions of said front and said rear panels, along at least a portion of said connection member, wherein said hooded portion comprises a hollowed out section for stowing objects within.

13. The seat cover of claim 12, further comprising a base portion capable of covering said seat bottom.

14. The seat cover of claim 12, wherein said side panels comprise elongated members.

15. The seat cover of claim 14, wherein said elongated members extend substantially along the length of said front panel and said rear panel, thereby giving said seat cover the appearance of a sleeved shirt.

16. The seat cover of claim 15, wherein said hood portion can be positioned to the top of the seat cover, such that said seat cover has the appearance of a hooded shirt thereby providing the impression of at least one passenger within said seat due to the appearance of a hooded shirt combined with the appearance of a sleeved shirt.

17. The seat cover of claim 12, wherein said hood portion can be positioned to the top of the seat cover, thereby giving said seat cover the appearance of a hooded shirt.

18. The seat cover of claim 12, wherein said hood portion can be positioned along said rear panel, thereby providing a pouch within said hood portion capable of stowing objects within.

19. The seat cover of claim 12, further comprising a pocket attachable to said rear panel said pocket thereby having the appearance of a hand-warming pouch.

20. The seat cover of claim 12, wherein said seat is selected from the group consisting of automotive seats, straight back chairs, recliners, and easy chairs.

21. The seat cover of claim 12, further comprising a logo.

22. The seat cover of claim 12, wherein said rim is V-shaped.

* * * * *